United States Patent [19]

Lew

[11] Patent Number: 4,938,075
[45] Date of Patent: * Jul. 3, 1990

[54] CONVECTIVE INERTIA FORCE FLOWMETER

[76] Inventor: Hyok S. Lew, 7890 Oak St., Arvada, Colo. 80005

[*] Notice: The portion of the term of this patent subsequent to May 16, 2009 has been disclaimed.

[21] Appl. No.: 164,541

[22] Filed: Mar. 7, 1988

Related U.S. Application Data

[63] Continuation-in-part of Ser. No. 14,278, Feb. 12, 1987, Pat. No. 4,776,220, and a continuation-in-part of Ser. No. 71,777, Jul. 10, 1987, Pat. No. 4,813,289, and a continuation-in-part of Ser. No. 78,206, Jul. 27, 1987, Pat. No. 4,829,832, and a continuation-in-part of Ser. No. 88,571, Aug. 24, 1987, Pat. No. 4,879,910.

[51] Int. Cl.$^5$ .............................................. G01F 1/84
[52] U.S. Cl. .............................................. 73/861.38
[58] Field of Search ........................... 73/861.37, 861.38

[56] References Cited

U.S. PATENT DOCUMENTS

| | | | |
|---|---|---|---|
| 4,127,028 | 11/1978 | Cox et al. | 73/861.38 |
| 4,660,421 | 4/1987 | Dahlin et al. | 73/861.38 |
| 4,730,501 | 3/1988 | Levien | 73/861.38 |

Primary Examiner—Herbert Goldstein

[57] ABSTRACT

The mass flowmeter of the present invention comprises at least one conduit including a three hundred sixty degree loop disposed intermediate inlet and outlet legs fixedly anchored to a rigid support wherein two sections of the three hundred sixty degree loop respectively adjacent to the inlet and outlet legs cross one another, and an electromagnetic vibrator exerting oscillatory forces on the two halves of the conduit at the crossing point of the conduit, which induces relative flexural vibrations of the two halves of the conduit, wherein the flexural vibrations have a first mode antisymmetric about the midsection of the conduit that is independent of the mass flow rate, and a second mode symmetric and dependent on the mass flow rate. The mass flow rate through the conduit is determined by measuring the phase difference in the flexural vibrations between the two halves of the conduit. The principles of the present invention also teach other embodiments of the mass flowmeter comprising a pair of conduits disposed in a parallel or series arrangement, wherein the flexural vibrations of the pair of the conduits have first mode independent of the mass flow and a second mode dependent on the mass flow rate, which second mode produces phase difference in the flexural vibrations between the pair of the conduits that determines mass flow rate.

11 Claims, 3 Drawing Sheets

CONVECTIVE INERTIA FORCE FLOWMETER

This patent application is a Continuation-In-Part to patent applications Ser. No. 07/014,278 entitled "Dual S-loop single tube Coriolis force flowmeter" filed on Feb. 12, 1987, that is now U.S. Pat. No. 4,776,220, Ser. No. 07/071,777 entitled "Convection attenuation flowmeter" filed on Jul. 10, 1987, that is now U.S. Pat. No. 4,813,289, Ser. No. 07/078,206 entitled "Convection inertia force flowmeter" filed on Jul. 27, 1987 that is now U.S. Pat. No. 4,829,832, and Ser. No. 07/088,571 entitled "Torsional vibration convection inertia force flowmeter" filed on Aug. 24, 1987, that is now U.S. Pat. No. 4,879,910.

BACKGROUND OF THE INVENTION

The mass flow measurement technology has made a landmark progress in recent years as the Coriolis force flowmeter has been introduced into the industry. The Coriolis force flowmeter determines mass flow rates by measuring the phase change in the flexural vibrations of the vibrating conduit depending directly on the amount of mass flow rate through the vibrating conduit. As a consequence, it provides a greater accuracy and reliability compared with other types of mass flowmeter measuring mass flow rate based on phenomena indirectly related to the mass flow rate such as convective heat transfer or absorption of a radiation. While the Coriolis force flowmeters of the present day satisfy many demands in flow measurement technology, there are many areas in the state of the art in the Coriolis force flowmeter technology which require further development and improvement. One of more notable short-comings in the existing Coriolis force flowmeter technology is its inability to measure mass flow rates of low values and high cost of the meter. The present invention teaches new and powerful principles leading to a mass flowmeter of greater sensitivity and reliability, which mass flowmeter is less expensive than existing meters as the more powerful effect of the Coriolis force employed therein requires less sophisticated electronic controllers and processors.

BRIEF SUMMARY OF THE INVENTION

The primary object of the present invention is to provide a mass flowmeter comprising a vibrating conduit including a three hundred sixty degree loop disposed intermediate inlet and outlet legs fixedly anchored to support, and an electromagnetic vibrator disposed at the crossing point of the vibrating conduit where the two halves thereof cross one another, that induces flexural vibrations of the two halves of the conduit relative to one another, wherein the flexural vibrations of the two halves of the vibrating conduit have a first mode antisymmetric about the midsection of the conduit and independent of the mass flow rate, and a second mode that is symmetric and dependent on the mass flow rate through the conduit. The mass flow rate through the vibrating conduit is determined from the difference in the flexural vibrations between the two halves of the vibrating conduit.

Another object is to provide a mass flowmeter that determines mass flow rate through the vibrating conduit from the phase difference in the flexural vibrations between the two halves of the vibrating conduit.

A further object is to provide a mass flowmeter including a pair of motion detectors respectively measuring the relative motions between the inlet leg and a section of the three hundred sixty degree loop adjacent to the outlet leg and between the outlet leg and another section of the three hundred sixty degree loop adjacent to the inlet leg.

Yet another object is to provide a mass flowmeter comprising a vibrating conduit that has a nodal section in the flexural vibrations generally coinciding with the midsection of the vibrating conduit, which nodal section experiences the second mode of the flexural vibrations only, which depends on the mass flow rate through the vibrating conduit.

Yet a further object is to provide a mass flowmeter including a motion detector measuring the flexural vibrations of the conduit at the nodal section and determining mass flow rate therefrom.

Still another object is to provide a mass flowmeter including a pair of motion detectors respectively measuring the flexural vibrations at the crossing point of the conduit and at the nodal section, wherein mass flow rate is determined from the phase difference between the two vibrations respectively measured by the two motion detectors.

Still a further object is to provide a mass flowmeter including a pair of the vibrating conduits respectively including a one hundred eighty degree loop, wherein mass flow rate through the pair of the vibrating conduits is determined from the relative vibrations between the nodal sections of the two vibrating conduits.

Yet still another object is to provide a mass flowmeter including a pair of motion detectors respectively measuring the flexural vibrations at the crossing point of at least one of the two vibrating conduits and the relative vibrations between the nodal sections of the two vibrating conduits, wherein mass flow rate is determined from the phase difference between the two vibrations respectively measured by the two motion detectors.

Yet still a further object is to provide a mass flowmeter comprising a pair of vibration conduits connected to the inlet and outlet legs in a parallel arrangement wherein the one extremity of the first conduit is connected to the inlet leg in a laterally resilient relationship, while the other extremity of the second vibrating conduit is connected to the outlet leg in a laterally resilient relationship. The mass flow rate is determined from the phase difference in the relative flexural vibrations between the first half of the two vibrating conduits connected to the inlet leg and the second half thereof connected to the outlet leg.

Additionally another object is to provide a mass flowmeter comprising a pair of vibrating conduits disposed in a series arrangement in a symmetric arrangement about the midsection of the combination thereof, wherein one extremity of the first conduit and the other extremity of the second conduit are resiliently secured to a support. The mass flow rate is determined from the phase difference in the flexural vibrations between the two vibrating conduits.

Additionally a further object is to provide a mass flowmeter of superior sensitivity and high reliability.

These and other objects of the present invention will become clear as the description thereof progresses.

BRIEF DESCRIPTION OF THE FIGURES

The present invention may be described with a great clarity and specificity by referring to the following figures.

DESCRIPTION OF THE ILLUSTRATED EMBODIMENTS

Figures 1, 2:
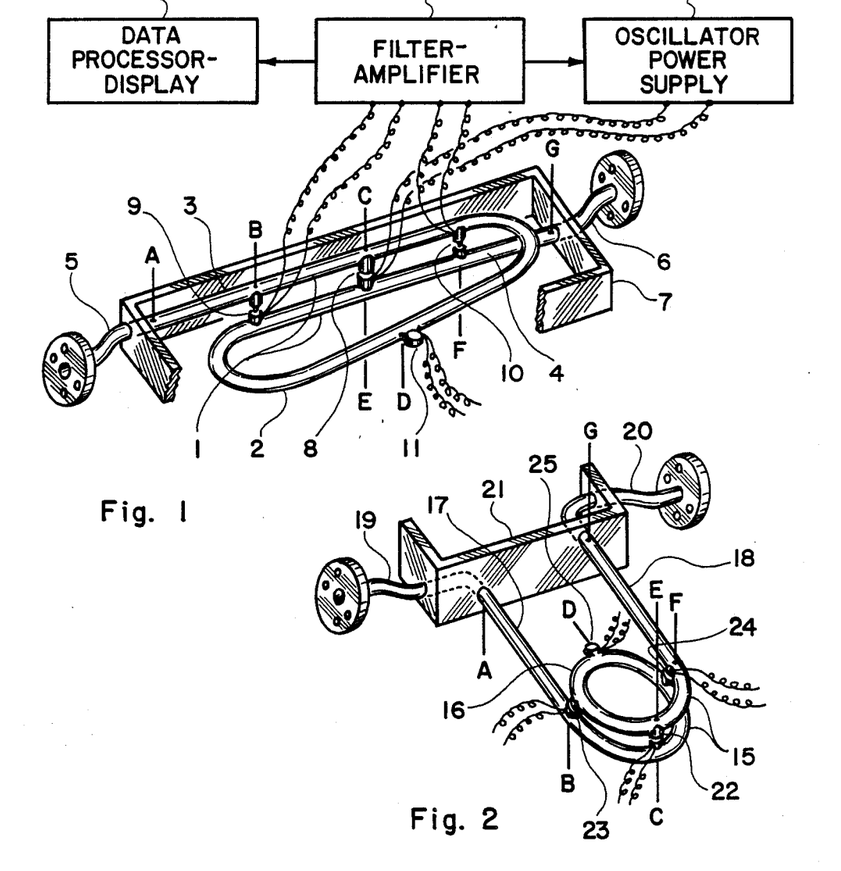
FIG. 1 illustrates a perspective view of an embodiment of the mass flowmeter of the present invention comprising a vibrating conduit including a three hundred sixty degree loop.
FIG. 2 illustrates another embodiment of the mass flowmeter comprising a vibrating conduit with a five hundred forty degree loop.

In FIG. 1 there is illustrated the fundamental embodiment of the mass flowmeter of the present invention. The conduit 1 includes a three hundred sixty degree loop 2 with two end sections 3 and 4 disposed in a generally parallel arrangement in a spaced relationship, which are respectively connected to a first port or inlet leg 5 and a second port or outlet leg 6 fixedly secured to a support or frame 7. An electromagnetic vibrator 8 disposed at a section including the plane of symmetry dividing the conduit 1 into two symmetric halves exerts oscillatory forces on the two halves of the conduit 1 and induces flexural vibrations of the two halves of the conduit relative to one another. The first motion detector 9 measures relative motions between the first end section 3 and a section of the three hundred sixty degree loop 2 adjacent to the second end section 4, while the motion detector 10 measures relative motions between the second end section 4 and another section of the three hundred sixty degree loop adjacent to the first end section 3. A third motion detector 11 may be included, which measures motions at the midsection of the conduit 1. Since the dynamic characteristics and the boundary conditions of the conduit are symmetric about the plane of symmetry, on which the electromagnetic oscillator 8 and the motion detector 11 are located, it is evident that the flexural vibrations of the two halves of the conduit 1 induced by the electromagnetic vibrator 8 are antisymmetric about the plane of symmetry when there is no mass flow through the conduit, which antisymmetric flexural vibrations is called the first mode. The mass flow of media moving through the conduit produces a symmetric or second mode of the flexural vibrations, which can be detected by comparing the two measurements respectively provided by the two motion detectors 9 and 10, or by the third motion detector 11. The oscillator power supply 12 energizes the electromagnetic vibrator 8 with alternating electric currents oscillating at the resonance frequency of the conduit 1, which resonance frequency is determined by analizing the output electromotive forces from the motion detectors 3 and/or 4 generaled by a frequency sweep. The filter-amplifier 13 conditions the output electric signals from the motion detectors 3 and 4. The data processor 14 analizes the output electric signals from the two motion detectors by taking the difference therebetween and isolate the second mode depending on the mass flow rate, from which the mass flow rate through the conduit 1 is determined. Alternatively, the mass flow rate may be determined from the output generated by the third motion detector 11 or by analizing three different outputs from the three motion detectors 3, 4 and 11 in combination.

In FIG. 2 there is illustrated another embodiment of the mass flowmeter having a similar construction and operating on the same principles as the embodiment shown in FIG. 1. This embodiment comprise a conduit 15 including a five hundred forty degree loop 16 which extends to two generally parallel end sections 17 and 18 respectively connected to two port legs 19 and 20. The two parallel end sections are fixedly secured to a support or frame 21 at sections respectively adjacent to the two port legs 19 and 20. The electromagnetic vibrator 22 indubes relative flexural vibrations of the two halves of the conduit 15, while the motion detectors 23 and 24 respectively measures the flexural vibrations of the two halves of the conduit 15. The second mode of the flexural vibrations depending on the mass flow rate is determined by comparing the two outputs from the two motion detectors 23 and 24, or from the output generated by a third motion detector 25 disposed at the midsection of the conduit, or by analizing all three outputs in combination.

The operating principles of the mass flowmeter of the present invention can be quantitatively described by carrying out a mathematical analysis on a vibrating conduit containing moving media. The motion of the fluid moving through a vibrating conduit is governed by the Navier-Stokes equation, which can be written in the form for the problem under investigation $$\delta \frac{\partial v}{\partial t} + \delta U \frac{\partial v}{\partial x} = -\frac{\partial P}{\partial y} + \quad (1)$$

-continued $$\mu\left(\frac{\partial^2 U}{\partial y^2} + \frac{\partial^2 U}{\partial z^2} + \frac{\partial^2 v}{\partial x^2} + \frac{\partial^2 v}{\partial y^2}\right),$$

where $\delta$ is the fluid density, x is the cordinate parallel to the conduit, y and z are two orthogonal cordinates perpendicular to the x-cordinate, v is the vibratory velocity of the conduit parallel to y-cordinate, U is the flow velocity of the fluid parallel to x-cordinate, p is the fluid pressure and $\mu$ is the shear viscosity of the fluid. The equation of motion of the vibrating conduit can be written in the form $$EI\frac{\partial^4 v}{\partial x^4} + m\frac{\partial^2 v}{\partial t^2} = \frac{\partial f}{\partial t}, \quad (2)$$

where E is the modulus of elasticity of the conduit material, I is the moment of inertia of the conduit cross section, m is the linear mass density of the conduit and f is the force exerted on the unit length of the conduit. Equations (1) and (2) can be combined to obtain equation $$\frac{\partial^4 v}{\partial x^4} + (m + \delta UA)\frac{\partial^2 v}{\partial t^2} + \delta UA\frac{\partial^2 v}{\partial x \partial t} = 0, \quad (3)$$

wherein the zero on the right-hand side of equation (3) replaces $$\frac{\partial^2 f}{\partial t^2}$$

as long as equation (3) is applied to a section of the vibrating conduit shown in FIGS. 1 or 2 in a region between sections A and C or G and C excluding the section C. While an exact solution of equation (3) accurately satisfying all of the boundary conditions can be addressed without any serious difficulty, it is more than enough to present a simple solution of equation (3) to analyze the effect of the fluid flow on the flexural vibrations of the conduit. It can be readily shown that fourth order partial differential equation (3) has a solution in the form $$\frac{v}{v_0} = \left(1 - \cosh\lambda\frac{x}{L}\right)\sin\omega t \pm$$
(4)
$$\left(\frac{\delta UA}{4EI}\frac{\omega L^2}{\lambda^2}\right) \times \cosh\lambda\frac{x}{L}\cos\omega t,$$

where $\lambda$ is a parameter satisfying the characteristic equation $$\left(\frac{\lambda}{L}\right)^4 - \omega^2\frac{m + \delta UA}{EI} = 0, \text{ and} \quad (5)$$

$\omega$ is the circular frequency of the vibration and L is the length between the sections A and C or G and C. The vibratory velocity given by equation (4) produces flexural deflection of the conduit given by equation $$\frac{y}{y_0} = -\left(1 - \cosh\lambda\frac{x}{L}\right)\cos\omega t \pm \quad (6)$$

$$\left(\frac{\delta UA}{4EI}\frac{\omega L^2}{\lambda^2}\right) \times \cosh\lambda\frac{x}{L}\sin\omega t.$$

The $\pm$ signs appearing on the right-hand side of equation (6) respectively apply to the two different sections of the conducts A-C and G-C, wherein the origin of the cordinates are located on the sections A and G, respectively, and the x-cordinates increases towards the section C. It is useful to notice that the positive direction of the x-cordinate for the section A-C is the same as the flow direction U, while that for the section G-C is opposite to the flow direction U. In other words, the motion detector 9 or 23 measures the vibratory velocity given by equation (4) with + signs appearing before the second term on the right-hand side, while the motion detector 10 or 24 measures that with − signs. Therefore the sum and difference of the two vibratory velocities respectively measured by the motion detectors 9 and 10 or 23 and 24 are given by equations $$\frac{\Sigma v}{v_0} = 2\left(1 - \cosh\lambda\frac{s}{L}\right)\sin\omega t, \text{ and} \quad (7)$$

$$\frac{\Delta v}{v_0} = \frac{\delta UA}{2EI}\frac{\omega L^2}{\lambda^2}\text{scosh}\lambda\frac{s}{L}\cos\omega t, \quad (8)$$

where s is the value of x-cordinate where the motion detector is located. It should be noticed that the sum of outputs from the two motion detectors given by equation (7) is the first mode of the flexural vibrations of the conduit independent of the mass flow rate, while the difference of the outputs from the two motion detectors given by equation (8) is the second mode of the flexural vibrations of the conduit dependent on the mass flow rate. By taking the difference between equations (6) and (7), one obtains the equation $$\frac{\Sigma v}{v_0} - \frac{\Delta v}{v_0} = \sin(\omega t - \phi), \quad (9)$$

where the phase angle $\phi$ is given by equation $$\phi = \tan^{-1}\left[\frac{\omega L^2 s}{4EI\lambda^2}\frac{\cosh\lambda\frac{s}{L}}{\left(1 - \cosh\lambda\frac{s}{L}\right)}(\delta UA)\right]. \quad (10)$$

Figure 3A:
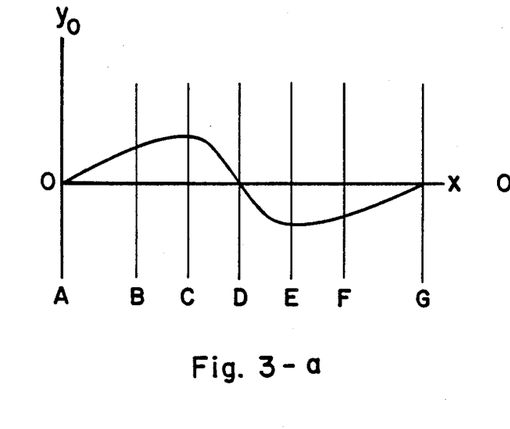
FIG. 3 illustrates the first and second modes of the flexural vibrations involved in the mass flowmeter of the present invention.
Figure 3B:
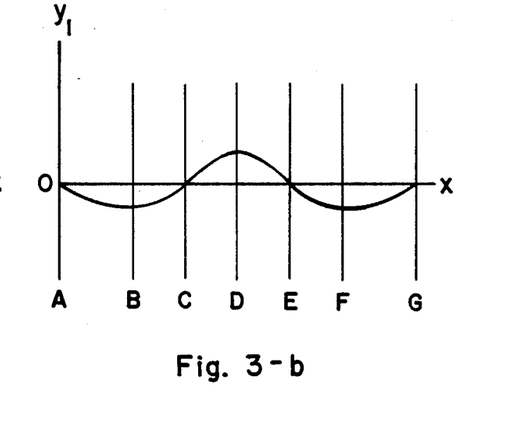

The boundary conditions of the vibrating conduit determines the value of $\lambda$. The resonance frequency $\omega$ is determined from equation (5). The mass flow rate ($\delta UA$) is determined by equation (10) when the phase angle difference $\phi$ between the first mode independent of the mass flow rate and the second mode dependent on the mass flow rate is measured by the motion detectors. The first mode of the deflection given by the first term on the right-hand side of equation (6) or the first mode of the vibratory velocity given by equation (7) is illustrated in FIG. 3-a, while the second mode of the deflection given by the second term on the right-hand side of equation (6) or the second mode of the vibratory velocity given by equation (8) is illustrated in FIG. 3-b. The third motion detector 11 or 25 is located at a section coinciding with the plane of the symmetry, which is a nodal section where the first mode of the vibrations is absent. As a consquence, the motion detector disposed at the nodal section measures the second mode of the vibrations only given by equation (8). The first mode of the vibrations is measured by one or both of the two motion detectors 9 and 10 or 23 and 24, or by a motion detector built into the electromagnetic vibrator 8 or 22. It should be mentioned that the actual relationship between the mass flow rate $\delta UA$ and the phase angle difference $\phi$ must be determined empirically, as the equation (10) is a result of simplified mathematical analisys of complex mathematical physics problem. It should be also mentioned that the mass flow rate may be determined from the amplitude of the second mode of the vibrations given by equation (8), which shows that the mass flow rate is directly proportional to the amplitude of the second mode of vibrations. It is generally recommended that a mass flowmeter determining the mass flow rate from the phase angle difference should employ the two motion detectors 9 and 10 or 23 and 24, while a mass flowmeter determining the mass flow rate from the amplitude of the second mode of the vibrations should employ a motion detector 11 or 25 disposed at the nodal section.

Figure 4:
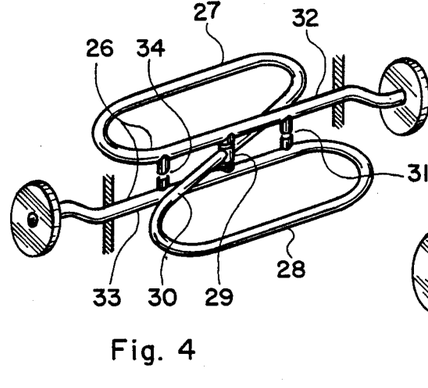
FIG. 4 illustrates an embodiment of the mass flowmeter compromising a vibrating conduit including a pair of three hundred sixty degree loops turning about two opposite directions.

In FIG. 4 there is illustrated an embodiment of the mass flowmeter comprising a conduit 26 including a pair of three hundred sixty degree loops 27 and 28 turning about two opposite directions. The electromagnetic vibrator 29 affixed to the midsection of the transition conduit 30 intermediate the two three hundred and sixty degreen loops 27 and 28 produces the relative flexural vibrations. The first motion detector 31 measures the relative vibration between the first port leg 32 and one end section of the three hundred sixty degree loop 28 adjacent to the second port leg 33, while the second motion detector 34 measures the relative vibration between the second port leg 33 and one end section of the three hundred sixty degree loop 27 adjacent to the first port leg 32. The mass flow rate is determined from the phase angle difference between the first and second mode of vibrations or from the amplitude of the second mode of vibration as described in conjunction with FIG. 3. Instead of affixing the electromagnetic vibrator to the midsection of the transition conduit 30, two halves threrof may be respectively affixed to the end sections of the two three hundred degree loops 27 and 28 crossing the transition conduit 30 and a third motion detector measuring the vibratory velocity of the nodal section coinciding with the midsection of the transition conduit 30 may be included, wherein the mass flow rate is determined from the amplitude of the vibratory velocity measured by the third motion detector or from the phase angle difference between the two vibrations respectively measured by the third motion detector and by one or both of the motion detectors 31 and 34.

Figure 5:
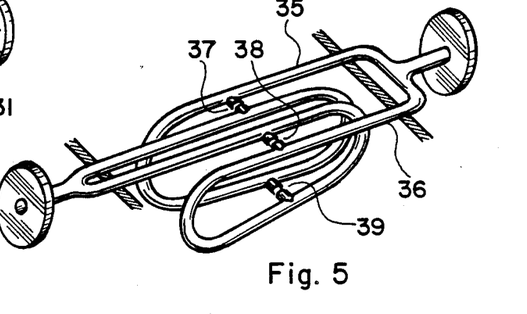
FIG. 5 illustrates an embodiment of the mass flowmeter comprising a pair of parallel vibrating conduits respectively including two three-hundred sixty degree loops.

In FIG. 5 there is illustrated an embodiment of the mass flowmeter comprising a pair of vibrating conduits 35 and 36 respectively having the same construction as the vibrating conduit shown in FIG. 1, which two vibrating conduits are disposed in a parallel arrangement symmetric about a plane intermediate the two vibrating conduits. The electromagnetic vibrators 37 and 38 respectively induce the flexural vibrations of the two conduits 35 and 36, while the motion detectors 39 with two halves respectively affixed to the nodal sections of the two vibrating conduits 35 and 36 measures the second mode of the relative vibrations between the nodal sections of the two vibrating conduits 35 and 36. The electromagnetic vibrators 37 and 38 may include motion detectors built thereinto. The mass flow rate is determined from the phase angle difference between the first and second mode of vibrations or from the amplitude of the second mode of vibrations.

Figure 6:
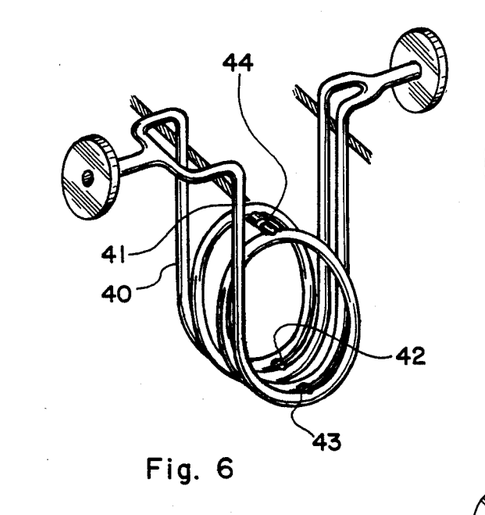
FIG. 6 illustrates an embodiment of the mass flowmeter comprising a pair of parallel vibrating conduits respectively including two five hundred forty degree loops.

In FIG. 6 there is illustrated an embodiment of the mass flowmeter comprising a pair of vibrating conduits 40 and 41 respectively having the same construction as the conduit shown in FIG. 2, which two vibrating conduits are disposed in a parallel arrangement symmetric about a plane intermediate the two vibrating conduits, which combination includes a pair of electromagnetic vibrators or vibrator-motion detector combinations 42 and 43, and a relative motion detector 44 disposed at the nodal sections of the two vibrating conduits. This mass flowmeter operates on the same principles as that shown in FIG. 5.

Figure 7:
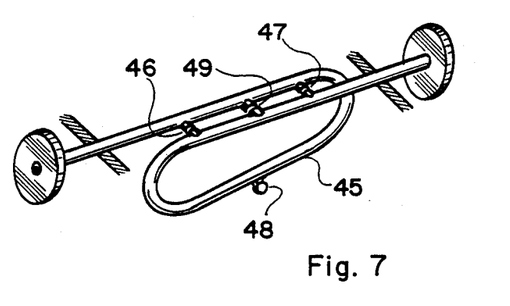
FIG. 7 illustrates an embodiment of the mass flowmeter of construction similar to that shown in FIG. 1.

In FIG. 7 there is illustrated an embodiment of the mass flowmeter comprising a vibrating conduit 45 having the same construction as the conduit shown in FIG. 1, which combination has a pair of electromagnetic vibrators 46 and 47 and one or both of the motion detectors 48 and 49 respectively disposed at the nodal section and at a section intermediate the two electromagnetic vibrators. The mass flow rate is determined from the amplitude of the vibratory motions measured by the motion detector 48 or from the phase angle difference between the two vibratory motions respectively measured by the two motion detectors 48 and 49.

Figure 8:
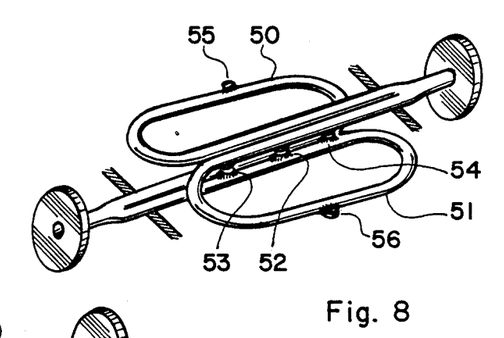
FIG. 8 illustrates an embodiment of the mass flowmeter including dual vibrating conduits respectively including two three hundred sixty degree loops turning about two opposite directions.

In FIG. 8 there is illustrated an embodiment of the mass flowmeter including a pair of vibrating conduits 50 and 51 disposed in a mirror image to one another, each of which has the same construction as the vibrating conduit shown in FIGS. 1 or 7, wherein the two vibrating conduit have the common electromagnetic vibrator 52 and a pair of common motion detectors 53 and 54. This combination may include two additional motion detectors 55 and 56 measuring vibratory velocities of the two vibrating conduits 50 and 51 at the nodal sections thereof, respectively. This combination operating on the same principles as those of the combinations shown in FIGS. 1 and 7 enables one to construct a mass flowmeter of a higher flow capacity without increasing the conduit diameter.

Figure 9:
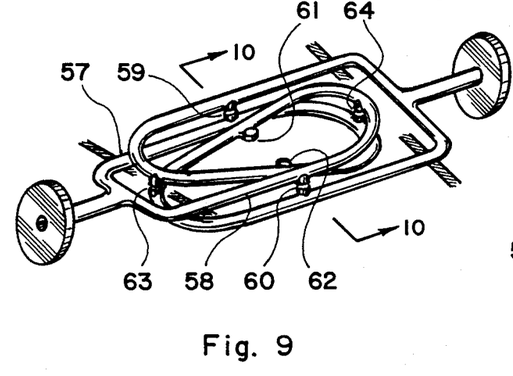
FIG. 9 illustrates another embodiment of the mass flowmeter including dual vibrating conduits respectively including two three hundred sixty degree loops.

In FIG. 9 there is illustrated an embodiment of the mass flow meter comprising a pair of vibrating conduits 57 and 58 respectively having the same construction as the conduit shown in FIGS. 1 or 7, which are disposed in an head-to-head opposing configuration symmetric about a plane including the nodal sections of the two vibrating conduits. Each of the two vibrating conduits includes the electromagnetic vibrator or vibrator-motion detector combinations 59 or 60 disposed in the same arrangement as described in conjunction with FIG. 1 and a motion detector 61 or 62 disposed at the nodal section thereof. This combination may further include another pair of motion detectors 63 and 64 respectively measuring relative vibrations between a first and second pair of matched extremities of the three hundred sixty degree loops respectively included in the two vibrating conduits 57 and 58. The second mode of vibrations are measured either by the difference between the two vibratory velocities respectively measured by the motion detectors 63 and 64 or by one or combination of the two motion detectors 61 and 62. The mass flow rate is determined from the phase angle difference between the first and second mode of vibrations or from the anplitude of the second mode of vibrations. Of course the first mode of vibrations are measured by one or both of the motion detectors built into the electromagnetic vibrators 59 and 60.

Figure 10:
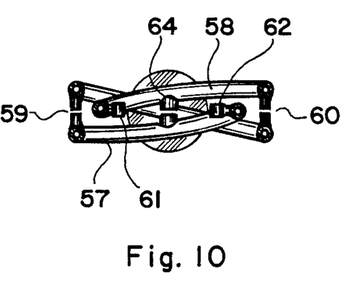
FIG. 10 illustrates a cross section of the embodiment shown in FIG. 9.

In FIG. 10 there is illustrated a cross section of the embodiment shown in FIG. 9, which cross section is taken along plane 10—10 as shown in FIG. 9. The arrangement of the electromagnetic vibrators of vibrator-motion detector combinations 59 and 60 in relation to the motion detectors 61 and 62 disposed at the nodal sections is clearly shown in this illustration. The installation of the relative motion detector 64 is also shown, which installation also represents the arrangement of the relative motion detector 63.

Figure 11:
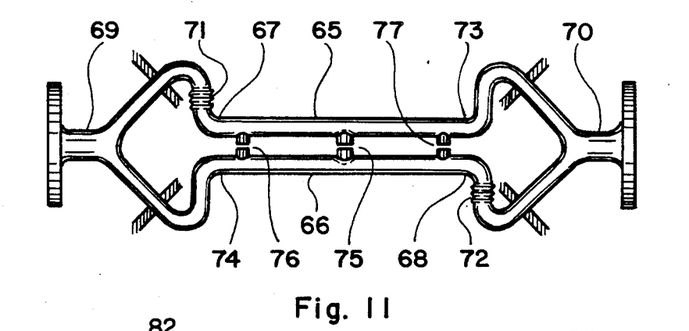
FIG. 11 illustrates an embodiment of the mass flowmeter including two parallel vibrating conduits of generally straight geometry.

In FIG. 11 there is illustrated an embodiment of the mass flowmeter including a pair of parallel vibrating conduits 65 and 66, wherein one extremity 67 of the first vibrating conduit 65 and the other extremity 68 of the second vibrating conduit 66 are respectively connected to the Y-shaped inlet and outlet conduits 69 and 70 by the flexible couplings 71 and 72, respectively, while the other extremity 73 of the first conduit 65 and one extremity 74 of the second conduit 66 are respectively connected to the inlet and outlet conduits 69 and 70 fixedly. The electromagnetic vibrator 75 disposed at the midsection of the two vibrating conduits 65 and 66 induces relative vibrations therebetween, while the two motion detectors 76 and 77 respectively disposed at the two opposite extremities of the two vibrating conduits measure the relative flexural vibrations of the two halves of the combination of the vibrating conduits 65 and 66. The difference between the two vibratory motions respectively measured by the two motion detectors 76 and 77 provides the second mode of the flexural vibrations. The mass flow rate is determined from the phase angle difference therebetween or from the amplitude of the second mode of vibrations.

Figure 12:
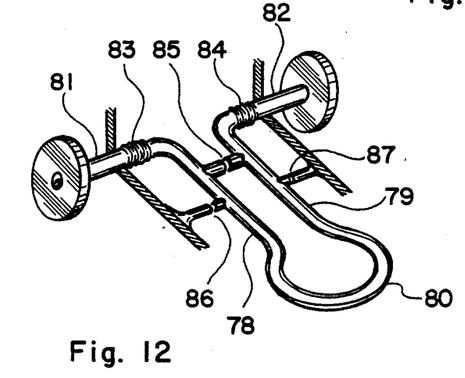
FIG. 12 illustrates an embodiment of the mass flowmeter including two vibrating conduits connected in series.

In FIG. 12 there is illustrated an embodiment of the mass flowmeter comprising a pair of vibrating conduits 78 and 79 connected to one another in series by a U-turn coupling 80, which combination is connected to an inlet and outlet leg 81 and 82 by a pair of flexible couplings 83 and 84, respectively. An electromagnetic vibrator 85 disposed at the extremities of the two vibrating conduits adjacent to the flexible couplings 83 and 85 induces relative vibrations between the two vibrating conduits 78 and 79. The two motion detectors 86 and 87 disposed adjacent to the electromagnetic vibrator 85 respectively measures the flexural vibrations of the two vibrating conduits 78 79. The mass flow rate is determined from the phase angle difference between the two vibratory motions respectively measured by the two motion detectors 86 and 87 or from the amplitude of the second mode of the vibrations obtained by taking the difference between the two vibratory motions respectively measured by the two motion detectors 86 and 87.

Figure 13:
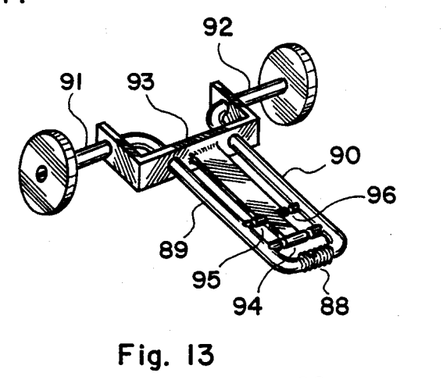
FIG. 13 illustrates another embodiment of the mass flowmeter including two vibrating conduits connected in series.

In FIG. 13 there is illustrated an embodiment of the mass flow meter having a construction similar to and operating on the same principles as the embodiment shown in FIG. 12. One exception is the flexible bellow coupling 88 connecting the two vibrating conduits 89 and 90 to one another in series in place of the U-turn coupling employed in the embodiment shown in FIG. 12. The extremities of the combination of the two vibrating conduits 89 and 90 are fixedly connected to an inlet and out let legs 91 and 92 and fixedly anchored to a support 93. The electromagnetic vibrator 94 disposed adjacent to the flexible coupling 88 induces relative flexural vibrations between the two vibrating conduits 89 and 90. The motion detectors 95 and 96 disposed near the flexibly coupled extremities of the vibrating conduits 89 and 90 measure the flexural vibrations of the two vibrating conduits 89 and 90, respectively.

Figure 14:
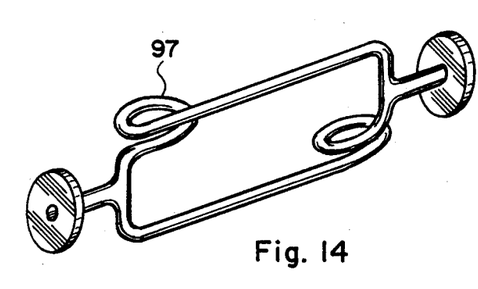
FIG. 14 illustrates a type of laterally resilient coupling usable in the construction of the mass flowmeter of the present invention in place of the bellow type flexible couplings.

In FIG. 14 there is illustrated a type of laterally resilient coupling 97 comprising a coiled loop of the conduit, which is employed in the construction of a mass flowmeter similar to the embodiment shown in FIG. 11. This resilient coupling replaces the bellow couplings employed in the embodiments shown in FIGS. 11, 12 and 13.

Figure 15:
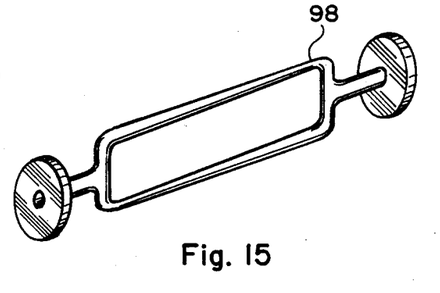
FIG. 15 illustrates another type of laterally resilient coupling usable in the construction of the mass flowmeter.

In FIG. 15 there is illustrated another type of the laterally resilient coupling 98 comprising an extremity of the vibrating conduit having a reduced diameter. The vibrating conduits with the flexible bellow coupling employed in the embodiments shown in FIGS. 11, 12 and 13 may be replaced with the tapered vibrating conduit as shown in FIG. 15.

Figure 16:
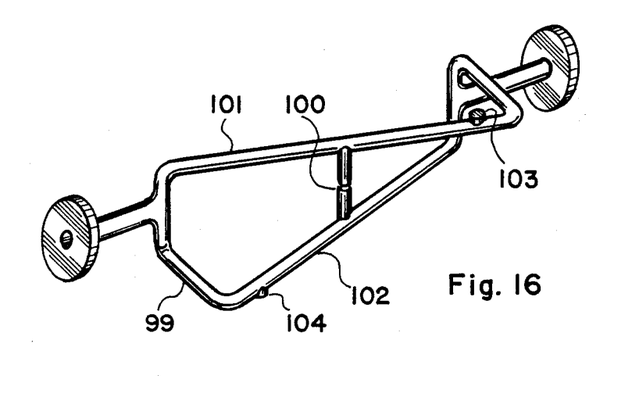
FIG. 16 illustrates a further type of laterally resilient coupling usable in the construction of the mass flowmeter.

In FIG. 16 there is illustrated a further type of the laterally resilient coupling 99 comprising an over-hanging section of the conduit, which may be employed in place of the flexible bellow couplings employed in the embodiments shown in FIGS. 11, 12 and 13. The electromagnetic vibrator 100 exerts oscillatory forces on the two vibrating conduits 101 and 102 at the midsections thereof crossing one another. The motion detectors 103 and 104 respectively measure the absolute flexural vibrations of the two vibrating conduits 101 and 102 at sections adjacent to the extremities connected to the over-hanging sections of the conduits. The mass flow rate is determined from phase angle difference between the two vibratory motions respectively measured by the two motion detectors 103 and 104 or from the amplitude of the second mode of vibrations obtained by taking the difference between the two vibratory motions respectively measured by the two motion detectors 103 and 104.

While the principles of the present inventions have now been made clear by the illustrative embodiments, there will be immediately obvious to those skilled in the art many modifications of the structures, arrangements, proportions, elements and materials which are particularly adapted to the specific working environments and operating conditions in the practice of the invention without departing from those principles. It is not desired to limit the inventions to the particular illustrated embodiments shown and described and, accordingly, all suitable modifications and equivalents may be resorted to falling within the scope of the inventions as defined by the claims which follow.

The embodiments of the inventions, in which an exclusive property or priviledge is claimed, are defined as follows:

1. An apparatus for measuring mass flow rate comprising in combination:
   (a) at least one conduit with two extremities secured to a rigid support including a first generally straight section extending from one of the two extremities in an over-hanging arrangement and a second generally straight section extending from the other of the two extremities in an over hanging arrangement, said first and second generally straight sections connected to one another by a smoothly curved midsection of the conduit of a loop angle ranging from 360 degrees to 540 degrees, said conduit substantially free of restriction or constraints along the length between the two extremities restraining flexural vibrations of the conduit in directions generally perpendicular to a plane parallel to said curved midsection of the conduit; wherein at least a portion of first half of the conduit including said first generally straight section and one half of said curved midsection, and at least a portion of second half of the conduit including said second generally straight section and the other half of said curved midsection over-lap one another with a space therebetween;

(b) means for exerting vibratory force on the overlapping portion of said first and second halves of the conduit, said vibratory force generating relative flexural vibration between said first and second halves of the conduit; and (c) means for determining difference in the flexural vibration between said first and second halves of the conduit as a measure of mass flow rate of media moving through the conduit.

2. The combination as set forth in claim 1 wherein said means for determining difference in flexural vibration comprises a first motion detector disposed intermediate said means for exerting vibratory force and said one of the two extremities of the conduit for measuring relative flexural vibration between said first and second halves of the conduit, and a second motion detector disposed intermediate said means for exerting vibratory force and said the other of the two extremities of the conduit for measuring relative flexural vibration between said first and second halves of the conduit.

3. The combination as set forth in claim 1 wherein said means for determining difference in the flexural vibration comprises at least one motion detector disposed at a nodal section in the midsection of the conduit whereat the flexural vibration vanishes when there is no media flow through the conduit.

4. An apparatus for measuring mass flow rate comprising in combination:

(a) at least one conduit with two extremities secured to a rigid support including a first generally straight section extending in a first direction from one of the two extremities in an over-hanging arrangement and a second generally straight section extending in a second direction substantially parallel and opposite to said first direction from the other of the two extremities in an over-hanging arrangement, said first and second generally straight sections connected to one another by a smoothly curved midsection of the conduit of a loop angle generally equal to 360 degree, said conduit substantially free of restriction or constraints along the length between the two extremities restraining flexural vibrations of the conduit in directions generally perpendicular to a plane parallel to said curved midsection of the conduit; wherein at least a portion of first half of the conduit including said first generally straight section and one half of said curved midsection, and at least a portion of second half of the conduit including said second generally straight section and the other half of said curved midsection over-lap one another with a space therebetween;

(b) means for exerting vibratory force on the overlapping portion of said first and second halves of the conduit, said vibratory force generating relative flexural vibration between said first and second halves of the conduit; and (c) means for determining difference in the flexural vibration between said first and second halves of the conduit as a measure of mass flow rate of media moving through the conduit.

5. The combination as set forth in claim 4 wherein said means for determining difference in flexural vibration comprises a first motion detector disposed intermediate said means for exerting vibratory force and said one of the two extremities of the conduit for measuring relative flexural vibration between said first and second halves of the conduit, and a second motion detector disposed intermediate said means for exerting vibratory force and said the other of the two extremities of the conduit for measuring relative flexural vibration between said first and second halves of the conduit.

6. The combination as set forth in claim 4 wherein said means for determining difference in the flexural vibration comprises at least one motion detector disposed at a nodal section in the midsection of the conduit whereat the flexural vibration vanishes when there is no media flow through the conduit.

7. The combination as set forth in claim 4 wherein said combination includes another conduit disposed in a mirror image to said first conduit about a plane parallel to said first and second generally straight sections of said at least one conduit.

8. An apparatus for measuring mass flow rate comprising in combination:

(a) at least one conduit with two extremities secured to a rigid support including a first generally straight section extending from one of the two extremities in an over-hanging arrangement and a second generally straight section extending from the other of the two extremities in an over-hanging arrangement in a substantially parallel arrangement with respect to the first generally straight section, said first and second generally straight sections connected to one another by a smoothly curved midsection of the conduit of a loop angle generally equal to 540 degrees, said conduit substantially free of restriction or constraints along the length between the extremities restraining flexural vibrations of the conduit in directions generally perpendicular to a plane parallel to said curved midsection of the conduit; wherein at least a portion of first half of the conduit including said first generally straight section and one half of said curved midsection, and at least a portion of second half of the conduit including said second generally straight section and the other half of said curved midsection over-lap one another with a space therebetween;

(b) means for exerting vibratory force on the overlapping portion of said first and second halves of the conduit, said vibratory force generating relative flexural vibration between said first and second halves of the conduit; and (c) means for determining difference in the flexural vibration between said first and second halves of the conduit as a measure of mass flow rate of media moving through the conduit.

9. The combination as set forth in claim 8 wherein said means for determining difference in flexural vibration comprises a first motion detector disposed intermediate said means for exerting vibratory force and said one of the two extremities of the conduit for measuring relative flexural vibration between said first and second halves of the conduit, and a second motion detector disposed intermediate said means for exerting vibratory force and said the other of the two extremities of the conduit for measuring relative flexural vibration between said first and second halves of the conduit.

10. The combination as set forth in claim 8 wherein said means for determining difference in the flexural vibration comprises a first motion detector disposed generally at a junction between said first generally straight section and said curved midsection for measuring relative flexural vibration between said first and second halves of the conduit, and a second motion detector disposed generally at a junction between said second generally straight section and said curved midsection for measuring relative flexural vibration between said first and second halves of the conduit.

11. The combination as set forth in claim 8 wherein said means for determining difference in the flexural vibration comprises at least one motion detector disposed at a nodal section in the midsection of the conduit whereat the flexural vibration vanishes when there is no media flow through the conduit.

* * * * *